United States Patent
Huang et al.

(10) Patent No.: US 10,873,702 B2
(45) Date of Patent: Dec. 22, 2020

(54) ADAPTIVE MOTION FILTERING IN AN UNMANNED AUTONOMOUS VEHICLE

(71) Applicants: QUALCOMM Incorporated, San Diego, CA (US); Yin Huang, Beijing (CN); Liang Zhang, San Diego, CA (US); Xiaoyi Zhu, Beijing (CN); Ruowei Wang, Beijing (CN); Jiangtao Ren, Beijing (CN)

(72) Inventors: Yin Huang, Beijing (CN); Liang Zhang, San Diego, CA (US); Xiaoyi Zhu, Beijing (CN); Ruowei Wang, Beijing (CN); Jiangtao Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/324,308

(22) PCT Filed: Feb. 24, 2017

(86) PCT No.: PCT/CN2017/074720
§ 371 (c)(1),
(2) Date: Feb. 8, 2019

(87) PCT Pub. No.: WO2018/053994
PCT Pub. Date: Mar. 29, 2018

(65) Prior Publication Data
US 2019/0182428 A1    Jun. 13, 2019

Related U.S. Application Data

(63) Continuation-in-part of application No. PCT/CN2016/099832, filed on Sep. 23, 2016.

(51) Int. Cl.
*H04N 5/232* (2006.01)
*B64C 39/02* (2006.01)
(Continued)

(52) U.S. Cl.
CPC ....... *H04N 5/23267* (2013.01); *B64C 39/024* (2013.01); *B64D 47/08* (2013.01);
(Continued)

(58) Field of Classification Search
CPC ........... H04N 5/23267; H04N 5/23258; H04N 5/144; H04N 5/23238; H04N 5/23254;
(Continued)

(56) References Cited

U.S. PATENT DOCUMENTS 7,932,925 B2   4/2011   Inbar et al.
8,063,940 B2 * 11/2011  Stavely ................. G03B 17/00
                                                  348/208.11
(Continued)

FOREIGN PATENT DOCUMENTS

CN    103345737 A    10/2013
CN    103728981 A    4/2014
(Continued)

OTHER PUBLICATIONS

International Search Report and Written Opinion—PCT/CN2016/099832—ISA/EPO—May 22, 2017. 11 pages.
(Continued)

*Primary Examiner* — Luong T Nguyen
(74) *Attorney, Agent, or Firm* — The Marbury Law Group/Qualcomm

(57) ABSTRACT

Embodiments include devices and methods for adaptive image processing in an unmanned autonomous vehicle (UAV). In various embodiments, an image sensor may capture an image, while a processor of the UAV obtains attitude information from one or more attitude sensors. Such information may include the relative attitude of the UAV and changes in attitude. The processor of the UAV may determine a UAV motion mode based, at least in part, on the obtained attitude information. The UAV motion mode may
(Continued)

result in the modification of yaw correction parameters. The processor of the UAV may further execute yaw filtering on the image based, at least in part, on the determined motion mode.

19 Claims, 9 Drawing Sheets

(51) Int. Cl.
    *H04N 5/14* (2006.01)
    *B64D 47/08* (2006.01)
    *H04N 5/353* (2011.01)
    *B64D 1/02* (2006.01)

(52) U.S. Cl.
    CPC ......... *H04N 5/144* (2013.01); *H04N 5/23238* (2013.01); *H04N 5/23254* (2013.01); *H04N 5/23258* (2013.01); *H04N 5/23261* (2013.01); *B64C 2201/027* (2013.01); *B64C 2201/108* (2013.01); *B64C 2201/123* (2013.01); *B64C 2201/127* (2013.01); *B64C 2201/141* (2013.01); *B64D 1/02* (2013.01); *H04N 5/3532* (2013.01)

(58) Field of Classification Search
    CPC ...... H04N 5/23261; B64D 47/08; B64D 1/02; B64C 39/024; B64C 2201/141; B64C 2201/027; B64C 2201/123; B64C 2201/108
    See application file for complete search history.

(56) References Cited

U.S. PATENT DOCUMENTS

| | | | |
|---|---|---|---|
| 8,149,392 B1* | 4/2012 | Corella | G01S 7/495 348/164 |
| 8,552,350 B2 | 10/2013 | Bielas et al. | |
| 8,583,296 B2* | 11/2013 | Allen | B64D 45/00 701/4 |
| 8,896,697 B2 | 11/2014 | Golan et al. | |
| 8,907,846 B2 | 12/2014 | Sharawi et al. | |
| 9,303,999 B2 | 4/2016 | Hesch et al. | |
| 9,413,962 B2 | 8/2016 | Tsubaki et al. | |
| 2013/0151040 A1 | 6/2013 | Allen et al. | |
| 2014/0267809 A1 | 9/2014 | Tsubaki | |
| 2015/0022678 A1* | 1/2015 | Tsubaki | H04N 5/23287 348/208.5 |
| 2015/0244938 A1* | 8/2015 | Petrakis | H04N 5/772 386/227 |
| 2015/0298822 A1 | 10/2015 | Eline et al. | |
| 2016/0070265 A1* | 3/2016 | Liu | G01C 21/00 701/3 |
| 2016/0078272 A1 | 3/2016 | Hammoud | |
| 2016/0091894 A1* | 3/2016 | Zhang | B64C 39/024 701/2 |
| 2016/0105648 A1 | 4/2016 | Eline et al. | |
| 2016/0219223 A1 | 7/2016 | Eline | |
| 2016/0327950 A1 | 11/2016 | Bachrach et al. | |
| 2018/0046187 A1* | 2/2018 | Martirosyan | G05D 1/0094 |

FOREIGN PATENT DOCUMENTS

| | | |
|---|---|---|
| CN | 105045281 A | 11/2015 |
| CN | 105549603 A | 5/2016 |
| GB | 2407226 A | 4/2005 |
| GB | 2481027 A | 12/2011 |
| WO | 2014180096 A1 | 11/2014 |

OTHER PUBLICATIONS

International Search Report and Written Opinion—PCT/CN2017/074720—ISA/EPO—Jul. 10, 2017. 11 pages.
Supplementary European Search Report—EP17852073—Search Authority—City—Apr. 21, 2020. 7 pages.

* cited by examiner

ADAPTIVE MOTION FILTERING IN AN UNMANNED AUTONOMOUS VEHICLE

RELATED APPLICATIONS

This application claims the benefit of priority of P.C.T. Application No. PCT/CN2016/099832 entitled "Adaptive Motion Filtering in an Unmanned Autonomous Vehicle" filed 23 Sep. 2016, the entire contents of which are hereby incorporated by reference.

BACKGROUND

Unmanned autonomous vehicles (UAVs) are being developed for a wide range of applications. UAVs are typically equipped with one or more sensors, such as cameras capable of capturing an image, a sequence of images, or video. However, motion of the UAV may cause an unacceptably distorted or wobbly image or video.

Image stabilization (IS) refers to the process of detecting and correcting spurious motion introduced due to camera shake during the capture of an image or video. In the most general sense, spurious global motion may include any deviation from an intended camera path and jitter introduced due to unintended camera movement.

A variety of mechanical image stabilization mechanisms and techniques are available. However, such mechanisms are typically too heavy and too expensive for incorporation and use with most UAVs.

SUMMARY

Various embodiments include methods that may be implemented on a processor of a UAV for processing an image captured by an image sensor of the UAV. Various embodiments may include capturing, by an image sensor of the UAV, an image or video frame, obtaining attitude information of the UAV from one or more attitude sensors, determining a UAV motion mode based, at least in part, on the obtained attitude information, and executing yaw filtering on the image based, at least in part, on the determined UAV motion mode. In various embodiments, the attitude information may include the relative attitude and orientation of the UAV and changes in attitude or orientation.

In some embodiments, executing yaw filtering may include calculating an average yaw over a sliding window, calculating a standard deviation of the calculated average yaw, determining whether a yaw threshold is exceeded based, at least in part, on the calculated average yaw and the calculated standard deviation, modifying a yaw correction parameter based, at least in part, on the determination of whether the yaw threshold is exceeded, and executing a filter function using the yaw correction parameter. Other embodiments may further include setting the yaw threshold to a frequency of 35 Hz in response to determining that the UAV motion mode is a fast yaw mode. Other embodiments may further include setting the yaw threshold to a frequency of 25 Hz in response to determining that the UAV motion mode is a hover mode. Other embodiments may further include, in response to determining that the yaw threshold is exceeded, incrementing a yaw correction parameter, determining whether a maximum yaw correction is exceeded, and setting the yaw correction parameter to the maximum yaw correction. Other embodiments may further include, in response to determining that the yaw threshold is not exceeded, decrementing a yaw correction parameter, determining whether a minimum yaw correction is exceeded, and setting the yaw correction parameter to the minimum yaw correction. In some embodiments, the filter function may include an infinite impulse response filter.

Various embodiments include a UAV having an imaging sensor (e.g., a camera), an attitude sensor, and a processor configured with processor-executable instructions to perform operations of the methods summarized above. Some embodiments include a UAV having means for performing functions of the methods summarized above. Some embodiments include a processor-readable storage medium having stored thereon processor-executable instructions configured to cause a processor of a UAV to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
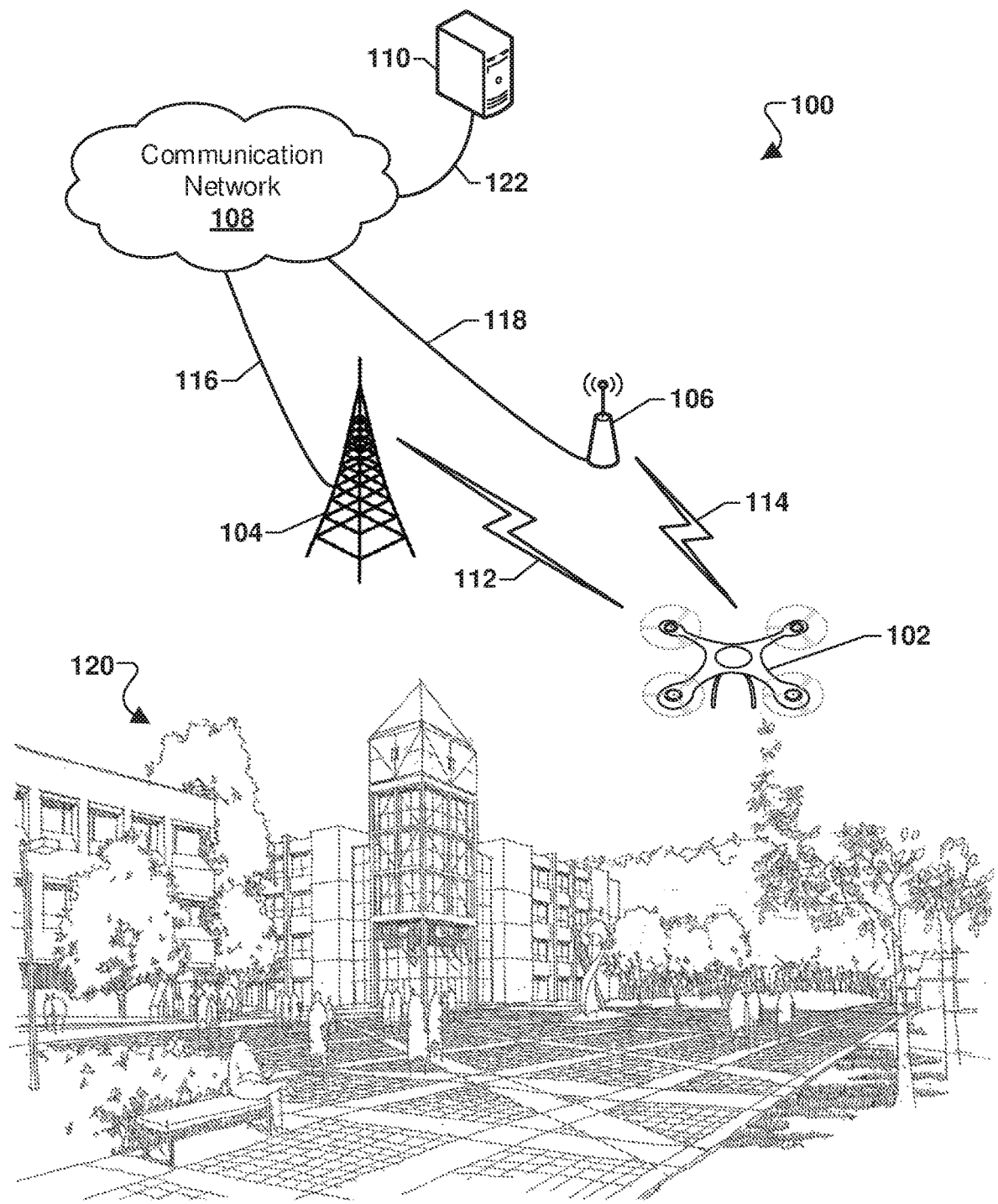
FIG. 1 is a system block diagram of a UAV operating within communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a UAV for processing an image captured by an image sensor of the UAV. The embodiment methods may adaptively track regions of interest within images for captured by an image sensor of a UAV without the need for a physical gimbal. Various embodiments improve the efficiency and accuracy of image processing of such images captured using a rolling shutter type image sensor in a UAV subject to pitch, yaw, and roll. Various embodiments further improve efficiency and accuracy of panning filtering by images captured by a UAV in motion.

As used herein, the term "UAV" refers to one of various types of unmanned autonomous vehicles. A UAV may include an onboard computing device configured to maneuver and/or navigate the UAV without remote operating instructions (i.e., autonomously), such as from a human operator or remote computing device. Alternatively, the onboard computing device may be configured to maneuver and/or navigate the UAV with some remote operating instruction or updates to instructions stored in a memory of the onboard computing device. In some implementations, a UAV may be an aerial vehicle propelled for flight using a plurality of propulsion units, each including one or more rotors, that provide propulsion and/or lifting forces for the UAV. UAV propulsion units may be powered by one or more types of electric power sources, such as batteries, fuel cells, motor-generators, solar cells, or other sources of electric power, which may also power the onboard computing device, navigation components, and/or other onboard components.

UAVs are increasingly equipped with image sensor devices for capturing images and video. Some UAVs equipped to image the ground may suffer from the problem that pitch and roll of the vehicle leads to images that are not aligned with the horizon. Further, spurious motions of the UAV may cause jitter or other distortions in images and video. While a variety of mechanical image stabilization mechanisms are available (e.g., mechanical gimbals and optical image stabilization (OIS)), such mechanisms are typically too heavy and too expensive for incorporation into and use with most UAVs.

Digital image stabilization (DIS) and electronic image stabilization (EIS) techniques may reduce or eliminate the need for mechanical image stabilization mechanisms, such as gimbals. A processor employing a DIS technique may estimate spurious motion of the UAV based on image data, such as changes from image to image, or frame to frame. For example, the processor may determine one or more image statistics from the image data. A processor may, for example, analyze consecutive frames to calculate a transform that when applied to an image or frame reduces the effects of motion with respect to the previous image or frame. However, image statistics cannot be used to easily distinguish motion of an image sensor from motion of a subject in an image sensor's field of view. Also, the use of image statistics in image stabilization may result in additional jitter or shake in a video in particular when moving subjects are present in the image sensor's field of view. Additionally, DIS performance may be impaired in conditions of low light or changing illumination.

To enable EIS, a processor of a UAV may analyze sensor data from a sensor of the UAV to determine spurious motion of the UAV. For example, a processor of the UAV may detect an orientation (e.g., pitch and roll) of the UAV, motion of the UAV (e.g., in three dimensions plus motion about the pitch, roll and yaw axes), accelerations (e.g., vibrations and jitter), and/or other information that may be available from one or more sensors (e.g., gyroscopes and accelerometers) of the UAV. Using the estimated orientation and motions of the UAV, the processor of the UAV may process an image or video to correct the image of distortions caused by the orientation and motions. In some embodiments, such processing may be performed in real time or in post-processing of the image or video. For example, a processor of the UAV may use sensor data to determine a rotation and translation to be applied to the output of the image sensor between two consecutive images or frames using, e.g., a gyroscope and accelerometer.

In an EIS system, the processor the UAV may process the image or video based on a coordinate system of the UAV and information about the mounting of an image sensor on the UAV, as well as information about an orientation of the output of the image sensor.

For instance, UAVs may include a wide variety of body frames, and manufacturers of such body frames may utilize different coordinate systems, such as in a flight controller or another processor of the UAV. One example of a body frame coordinate system is North-East-Down (NED). In such a NED body frame coordinate system, positive values along the x-axis indicates north, positive values along the y-axis indicates east, and positive values along the x-axis indicates down (i.e., toward gravity). Another example of a body frame coordinate system is North-West-Up (NWU). In a NWU body frame coordinate system, positive values along the x-axis indicates north, positive values along the y-axis indicates west, and positive values along the x-axis indicates up (i.e., away from gravity). Different UAV manufacturers and suppliers may use different coordinate systems.

Various embodiments provide adaptive region of interest tracking filters for a digital gimbal in a UAV. Various embodiments identify UAV operation modes by attitudes the UAV measures: hovering or fast yaw (i.e., rapid movement). Various embodiments enable mode identification based on yaw standard deviation from sliding window observation versus a predefined threshold. Various embodiments may enable region of interest tracking based, at least in part, on a $1^{st}$-order infinite impulse response (IIR) filter with adaptive coefficient assignments. The various embodiments may enable dynamic filter speed based, at least in part, on a determined operational mode.

In various embodiments, an image sensor of the UAV may capture an image or video frame. The UAV may obtain attitude information from one or more attitude sensors. Such attitude sensors may include the accelerometers and/or gyroscopes of the UAV avionics system. Attitude information may include the relative attitude (i.e., orientation about the roll, pitch, and yaw axes) of the UAV and changes in attitude (i.e., rates of rotation about the roll, pitch, and yaw axes). A processor of the UAV may determine a UAV motion mode based, at least in part, on the obtained attitude information. The UAV motion mode may result in the modification of yaw correction parameters. The processor of the UAV may further execute yaw filtering on the image based, at least in part, on the determined motion mode.

Various embodiments may be implemented within a UAV operating within a variety of communication systems 100, an example of which is illustrated in FIG. 1. The communication system 100 may include a UAV 102, a base station 104, an access point 106, a communication network 108, and a network element 110.

The base station 104 and the access point 106 may provide wireless communications to access the communication network 108 over a wired and/or wireless communications backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The UAV 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The UAV 102 and the network element 110 may communicate via the communication network 108. The network element 110 may provide the UAV 102 with a variety of information, such as navigation information, weather information, information about local air, ground, and/or sea traffic, movement control instructions, and other information, instructions, or commands relevant to operations of the UAV 102.

In various embodiments, the UAV 102 may move through an environment 120. As the UAV 102 moves through the environment 120, the processor of the UAV 102 may capture images or video of an aspect of the environment 120.

Figure 2:
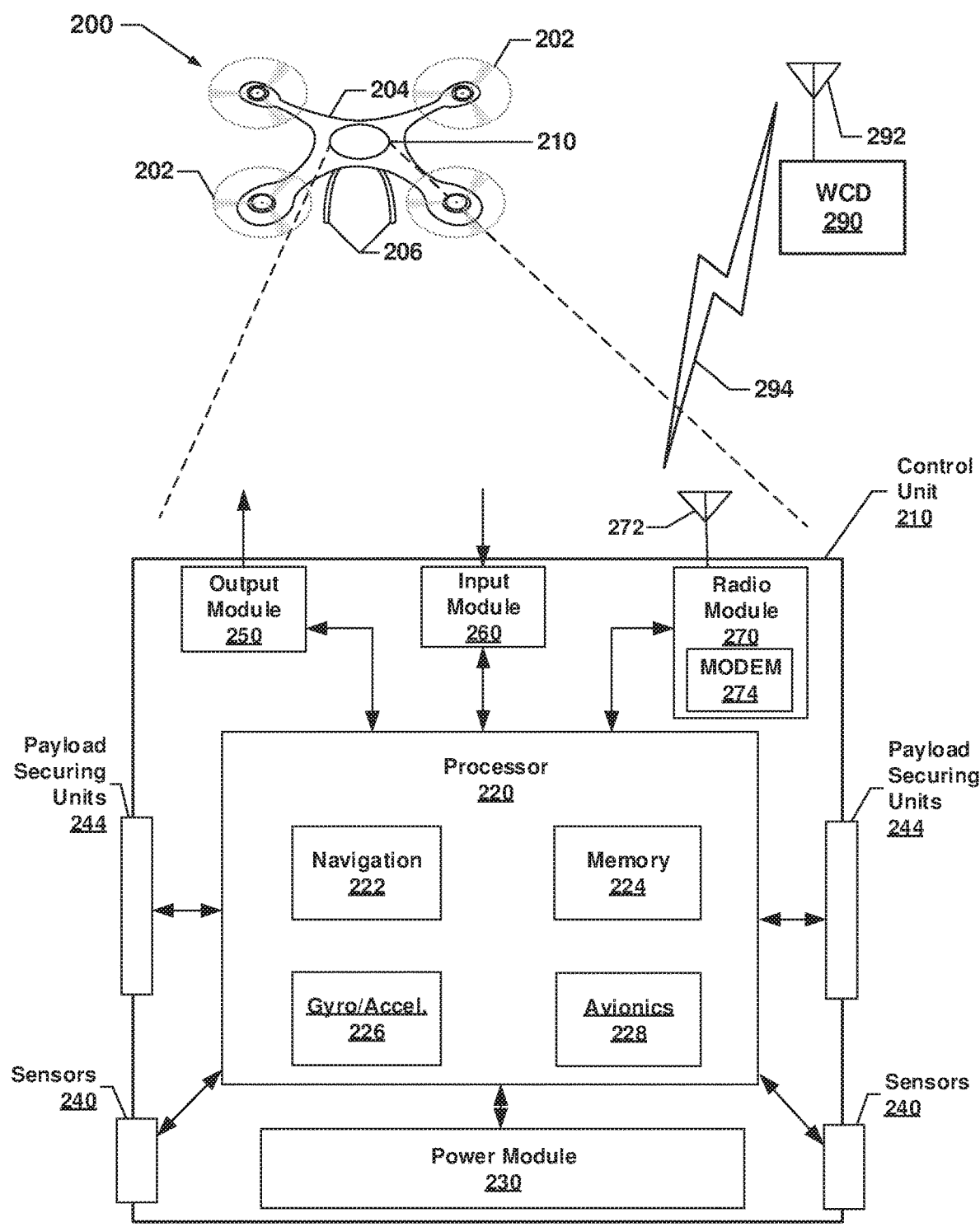
FIG. 2 is a component block diagram illustrating components of a UAV according to various embodiments.

UAVs may include winged or rotorcraft varieties. FIG. 2 illustrates an example UAV 200 of a rotary propulsion design that utilizes one or more rotors 202 driven by corresponding motors to provide lift-off (or take-off) as well as other aerial movements (e.g., forward progression, ascension, descending, lateral movements, tilting, rotating, etc.). The UAV 200 is illustrated as an example of a UAV that may utilize various embodiments, but is not intended to imply or require that various embodiments are limited to rotorcraft UAVs. Various embodiments may be used with winged UAVs as well. Further, various embodiments may equally be used with land-based autonomous vehicles, water-borne autonomous vehicles, and space-based autonomous vehicles.

With reference to FIGS. 1 and 2, the UAV 200 may be similar to the UAV 102. The UAV 200 may include a number of rotors 202, a frame 204, and landing columns 206 or skids. The frame 204 may provide structural support for the motors associated with the rotors 202. The landing columns 206 may support the maximum load weight for the combination of the components of the UAV 200 and, in some cases, a payload. For ease of description and illustration, some detailed aspects of the UAV 200 are omitted such as wiring, frame structure interconnects, or other features that would be known to one of skill in the art. For example, while the UAV 200 is shown and described as having a frame 204 having a number of support members or frame structures, the UAV 200 may be constructed using a molded frame in which support is obtained through the molded structure. While the illustrated UAV 200 has four rotors 202, this is merely exemplary and various embodiments may include more or fewer than four rotors 202.

The UAV 200 may further include a control unit 210 that may house various circuits and devices used to power and control the operation of the UAV 200. The control unit 210 may include a processor 220, a power module 230, sensors 240, payload-securing units 244, an output module 250, an input module 260, and a radio module 270.

The processor 220 may be configured with processor-executable instructions to control travel and other operations of the UAV 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with a server (e.g., the network element 110) through a wireless connection (e.g., a cellular data network) to receive data useful in navigation, provide real-time position reports, and assess data.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the UAV 200 that may be used in navigation and positioning calculations, as well as providing data used in various embodiments for processing images.

Figure 3A:
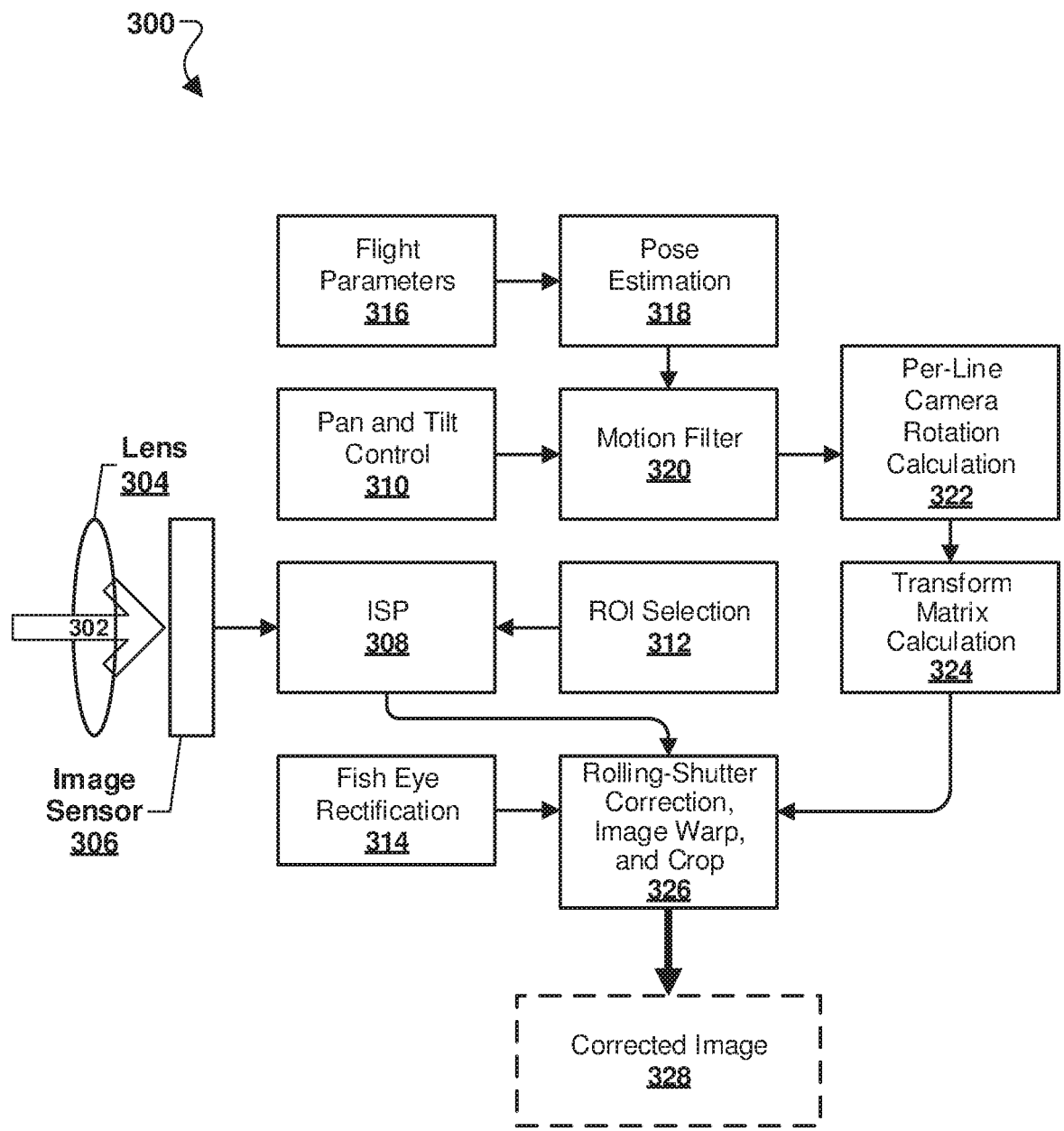
FIG. 3A is a component block diagram illustrating components of an image capture and processing system of a UAV according to various embodiments.

The processor 220 may further receive additional information from the sensors 240, such as an image sensor 306 (as illustrated in FIG. 3A and described below) or optical sensor (e.g., capable of sensing visible light, infrared, ultraviolet, and/or other wavelengths of light). The sensors 240 may also include a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations. The sensors 240 may include contact or pressure sensors that may provide a signal that indicates when the UAV 200 has made contact with a surface. The payload-securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing units 244, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively, or additionally, the power module 230 may be configured to manage its own charging. The processor 220 may be coupled to the output module 250, which may output control signals for managing the motors that drive the rotors 202 and other components.

The UAV 200 may be controlled through control of the individual motors of the rotors 202 as the UAV 200 progresses toward a destination. The processor 220 may receive data from the navigation unit 222 and use such data in order to determine the present position and orientation of the UAV 200, as well as the appropriate course towards the destination or intermediate sites. In various embodiments, the navigation unit 222 may include a GNSS receiver system (e.g., one or more global positioning system (GPS) receivers) enabling the UAV 200 to navigate using GNSS signals. Alternatively, or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other UAVs, etc.

The radio module 270 may be configured to receive navigation signals, such as signals from aviation navigation facilities, etc., and provide such signals to the processor 220 and/or the navigation unit 222 to assist in UAV navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the UAV 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a UAV operator, a third-party service (e.g., package delivery, billing, etc.), or a site communication access point. The UAV 200 may communicate with a server through one or more intermediate communication links, such as a wireless telephony network that is coupled to a wide area network (e.g., the Internet) or other communication devices. In some embodiments, the UAV 200 may include and employ other forms of radio communication, such as mesh connections with other UAVs or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

While various components of the control unit 210 are illustrated as separate components, some or all of the components (e.g., the processor 220, the output module 250, the radio module 270, and other units) may be integrated together in a single device or module, such as a system-on-chip module.

FIG. 3A illustrates an image capture and processing system 300 of a UAV (e.g., 102, 200 in FIGS. 1 and 2) according to various embodiments. With reference to FIGS. 1-3A, the image capture and processing system 300 may be implemented in hardware components and/or software components of the UAV, the operation of which may be controlled by one or more processors (e.g., the processor 220 and/or the like) of the UAV. To enable digital image stabilization, spurious motion of the UAV may be estimated from information detected by a processor of the UAV. One embodiment of components that may enable such digital image stabilization is illustrated in the image capture and processing system 300.

An image sensor 306 may capture light of an image 302 that enters through a lens 304. The lens 304 may include a fish eye lens or another similar lens that may be configured to provide a wide image capture angle. The image sensor 306 may provide image data to an image signal processing (ISP) unit 308. A region of interest (ROI) selection unit 312 may provide data to the ISP 308 for the selection of a region of interest within the image data.

The ISP 308 may provide image information and ROI selection information to a rolling-shutter correction, image warp, and crop unit 326. A fish eye rectification unit 314 may provide information and/or processing functions to the rolling-shutter correction, image warp, and crop unit 326.

A flight parameters unit 316 may determine inertial measurement data and UAV position and orientation data. For example, the flight parameters unit 316 may obtain or receive the inertial measurement data and UAV position and orientation data from one or more sensors of the UAV (e.g., the sensors 240), The flight parameters unit 316 may provide the inertial measurement data and UAV position and orientation data to a pose estimation unit 318. ("Pose" is a portmanteau of "position" and "orientation.")

The pose estimation unit 318 may determine a position and orientation of the UAV based on the inertial measure data and the position and orientation data. In some embodiments, the pose estimation unit 318 may determine the position and orientation (e.g., pitch, roll, and yaw) of the UAV based on a coordinate system of the UAV (e.g., NED or NWU). The pose estimate unit 318 may provide the determined position and orientation of the UAV to a motion filter unit 320. A pan and tilt control unit 310 may provide data about the pan and/or tilt of the image sensor 306 to the motion filter unit 320.

The motion filter unit 320 may determine physical and/or virtual pose changes of an image sensor 306 of the UAV based on the position and orientation information from the pose estimation unit 318 and the pan and/or tilt information from the pan and tilt control unit 310. In some embodiments, the motion filter unit 320 may determine the physical or virtual pose changes of the image sensor 306 over time. In some embodiments, the motion filter unit 320 may determine the physical or virtual pose changes based on one or more changes between a first image and second subsequent image. In some embodiments, the motion filter unit 320 may determine the physical or virtual pose changes of the image sensor 306 on a frame-by-frame basis. The motion filter 320 unit may provide the determined physical and/or virtual pose changes of an image sensor 306 to a per-line camera rotation calculation unit 322.

The per-line camera rotation calculation unit 322 may determine a rotation to perform to the image information on a line-by-line basis. The per-line camera rotation calculation unit 322 may provide information about the determined rotation to a transform matrix calculation unit 324.

The transform matrix calculation unit 324 may determine a transformation matrix for use in processing an image. The transform matrix calculation unit 324 may provide the transformation matrix to the rolling-shutter correction and warp unit 326.

The rolling-shutter correction and warp unit 326 may crop the image information, correct for distortions in the image caused by the lens 304, and may apply the transformation matrix to the image information. Thus, the rolling-shutter correction and warp unit 326 may provide as output a corrected image 328 based on the cropping, distortion correction, and/or application of the transformation matrix. In some embodiments, the corrected image 328 may include an image having a corrected horizontal orientation or horizontal rotation. In some embodiments, the corrected image 328 may include a stabilized video output.

Figure 3B:
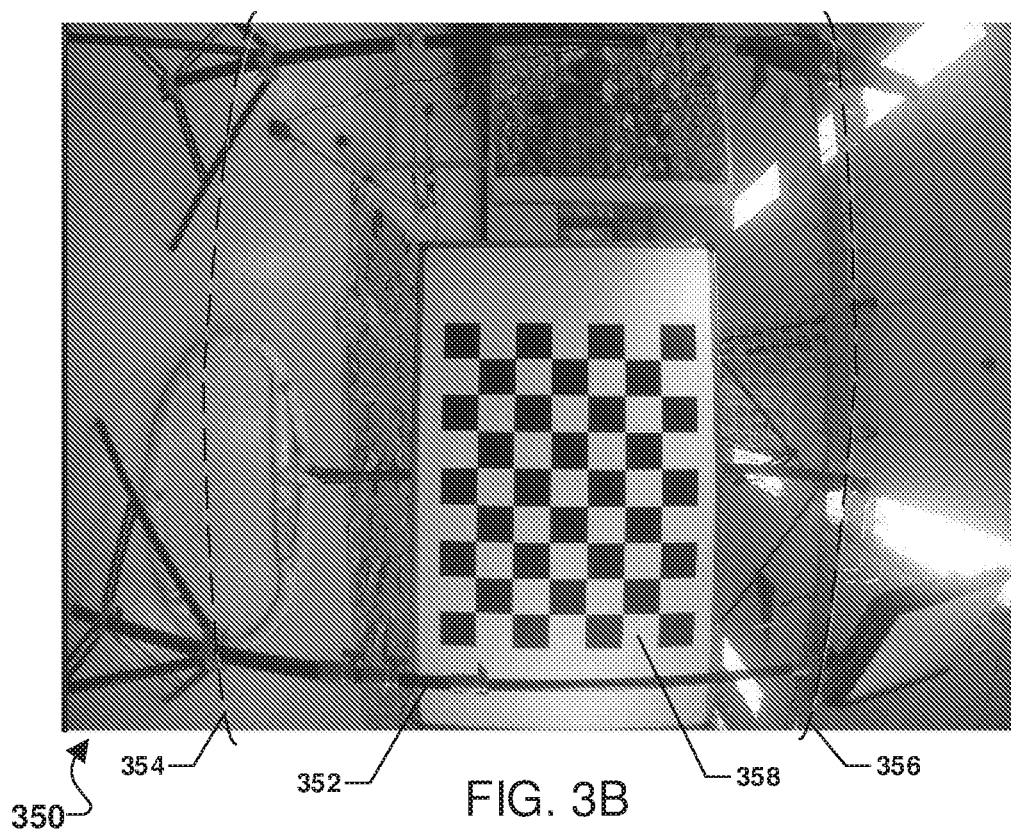
FIG. 3B illustrates a distorted image according to various embodiments.

FIG. 3B illustrates a distorted image 350 according to various embodiments. With reference to FIGS. 1-3B, the distorted image 350 may include one or more distortions, for example a curvature of a straight object 352, or the distortions indicated by distortion markers 354 and 356, and by the test image 358.

Figure 3C:
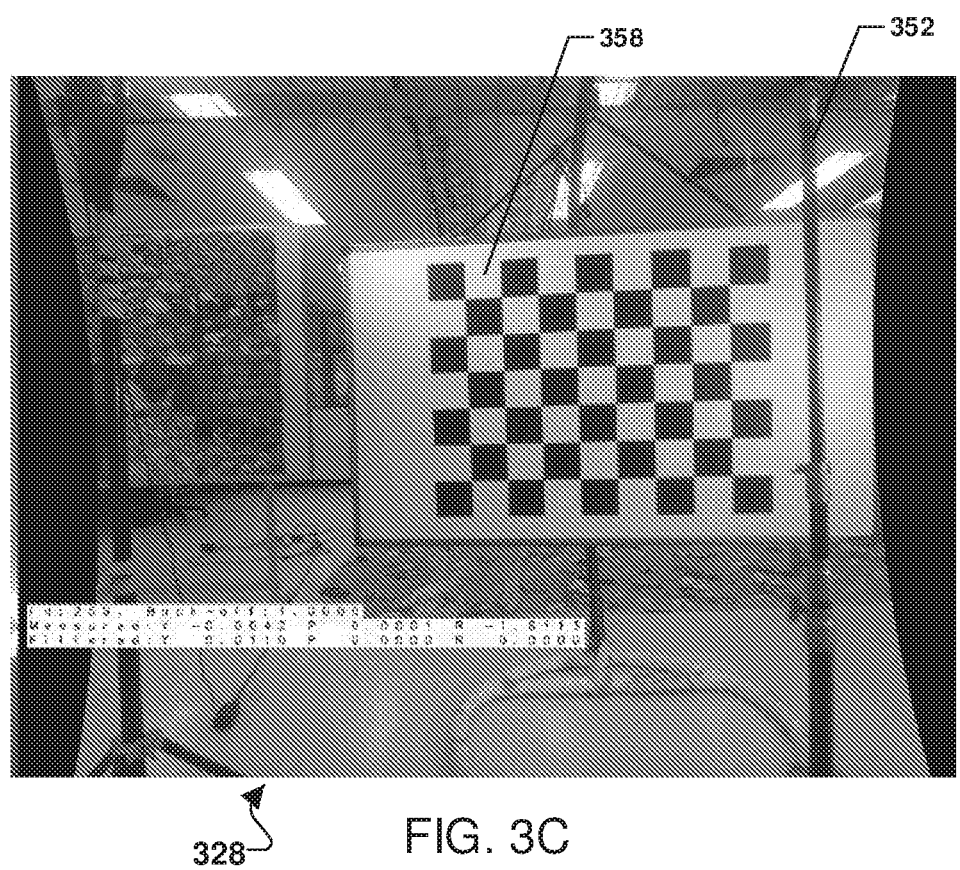
FIG. 3C illustrates a corrected image according to various embodiments.

FIG. 3C illustrates a corrected image 328 according to various embodiments. With reference to FIGS. 1-3C, the corrected image 328 has been rotated 90 degrees counter-clockwise, and includes corrections to, for example, the straight object 352 and the test image 358.

Figure 4A:
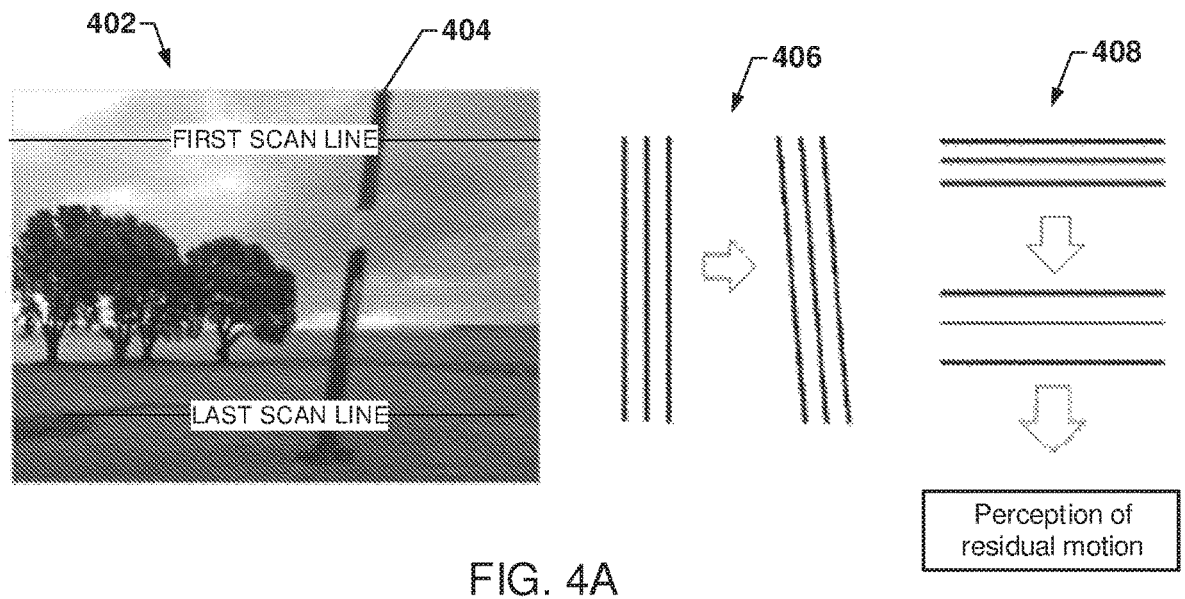
FIGS. 4A and 4B illustrate image distortion in an image captured by an image sensor on a moving platform according to various embodiments.
Figure 4B:
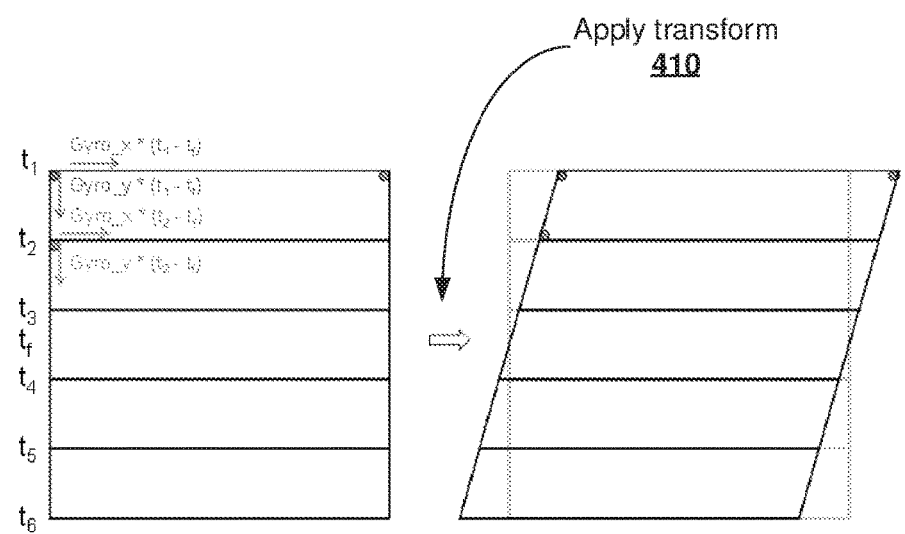

FIGS. 4A and 4B illustrate image distortion in an image captured by an image sensor 306 on a moving platform according to various embodiments. With reference to FIGS. 1-4B, a processor of a UAV (e.g., the processor 220 and/or the like) and hardware components and/or software components of the UAV may capture and process an image or video using an image sensor of the UAV (e.g., the image sensor 306).

With reference to FIGS. 1-4A, image 402 was captured by a moving image sensor 306, which includes a skewed object 404. For example, rolling shutter distortion may occur in images, and particularly video, captured by certain image sensors (e.g., complementary metal-oxide-semiconductor (CMOS) image sensors), which record every frame line-by-line from top to bottom of the image, rather than as a single snapshot at a point in time. Because parts of the image are captured at different times, image sensor motion may cause image distortion referred to as a "jelly-effect" or "Jello wobble." The distortion illustrated in the image 402 may be caused by an object moving quickly through the image sensor's field of view, or by camera translation (e.g., horizontal or rotational motion of the camera). In addition, fast-moving objects may be distorted with diagonal skews, as illustrated by a skewed object 404 in the image 402. A processor may determine motion of the images sensor during the time taken to traverse from the first to the last line of the frame, and the processor may correct for sensor-motion induced rolling shutter distortion.

FIG. 4B illustrates rolling shutter distortion that may be cause by a pitch and a yaw of a motion sensor. Image sensor rotation (e.g., caused by pitch and yaw of a platform of the image sensor, e.g., a UAV) may cause two distinct effects due to the rolling shutter. For example, changes in yaw during exposure of a frame may cause vertical lines to develop a diagonal skew 406. In addition, changes in pitch during exposure of a frame may change a separation 408 between horizontal lines and may lead to a perception of residual motion along a Y-axis (e.g., horizontal axis) of the image.

With reference to FIGS. 1-4B, in some embodiments, a processor may correct rolling shutter distortion by modeling a motion of pixels within the image or frame. For example, the processor may divide the image or frame into multiple sub-frames and calculate an affine transform for each sub-frame. In some implementations, the processor may model the motion of pixels captured at times t1-t6 as compared to time tf. Time tf may include a selected reference time, which may be a midpoint time between times t1 and t6. In some embodiments, time t1 may equal the start time of frame capture (SOF) minus half of an exposure duration (a duration of time during which the image or frame is captured), and may be represented according to the following equation:

$$t1 = SOF - exposure/2 \qquad [\text{Equation 1}]$$

In some embodiments, t6 may equal the end time of frame capture (EOF) minus half of the exposure duration, and may be represented according to the following equation:

$$t6 = EOF - exposure/2 \qquad [\text{Equation 2}]$$

In some embodiments, tf may be represented according to the following equation:

$$tf = (t1 + t6)/2 \qquad [\text{Equation 3}]$$

In some embodiments, the processor may determine the number of sub-frames (e.g., sub-frames at times t1, t2, t3, t4, t5, and t6) as a function of a maximum frequency of motion (which may be set as an image capture parameter).

The processor may then determine a transform, such as an affine transform, for time tf. The processor may apply the determined transform 410 to each sub-frame. Applying the transform to each sub-frame serves to model the entire frame as being captured by a global shutter at time tf.

Figure 5A:
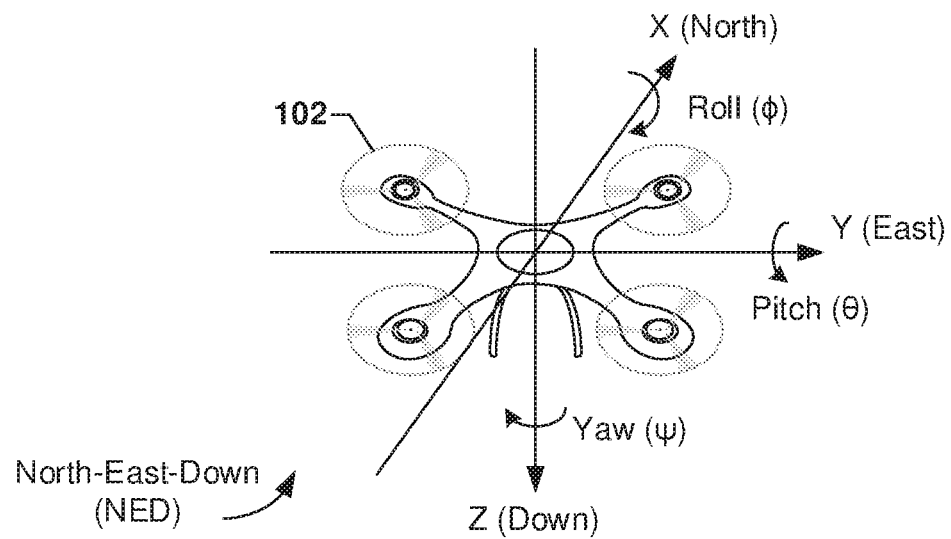
FIGS. 5A and 5B illustrate coordinate systems of UAVs according to various embodiments.
Figure 5B:
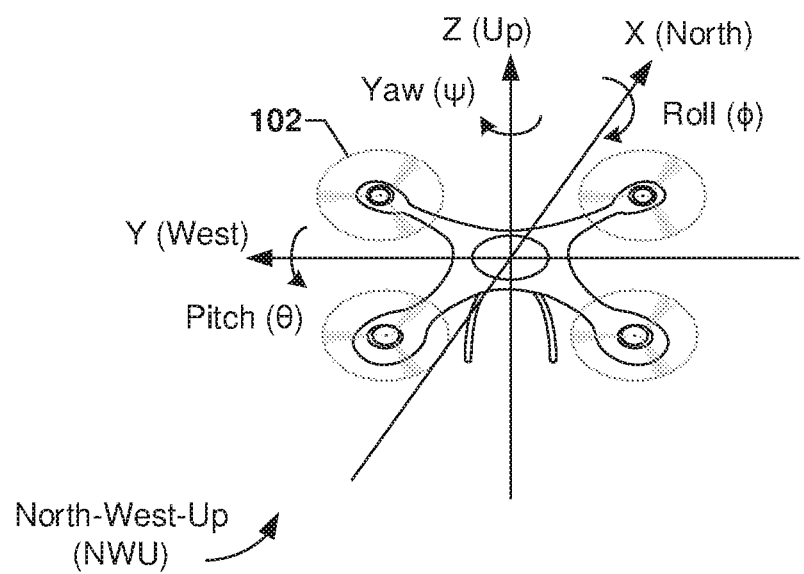

FIGS. 5A and 5B illustrate body frame coordinate systems of UAVs according to various embodiments. With reference to FIGS. 1-5B, a processor of a UAV (e.g., the processor 220 and/or the like) and hardware components and/or software components of the UAV may capture and process an image or video based on a coordinate system of the UAV (in addition to information about the mounting or orientation of an image sensor on the UAV, and information about an orientation of the output of the image sensor). UAVs may include a wide variety of body frames, and manufacturers of such body frames may utilize different coordinate systems, for example, in a flight controller or another processor of the UAV.

UAVs, and relatively smaller UAVs in particular, may experience rotor spinning with high revolutions per minute (RPM) (e.g., 10× thousands RPM) that may cause the UAV to shake or wobble. As such, a rolling shutter image sensor may capture images subject to significant distortion. Correcting such inhomogeneous motion per frame may include dividing an entire image, or an entire frame of a video, into multiple stripes, in which each stripe may be a row or multiple rows. Each row may be based on the image sensor line read input, or may be a division of the entire image (or frame) into stripes of a determined height and width, or a division of the entire image (or frame) into a determined number of stripes regardless of height and width. The correction may also include estimating an image sensor pose per stripe (e.g., based on an interpolation between two determined positions). Finally, the correction may include applying the per stripe pose (e.g., transformation matrix) to correct distortion in the image (or frame).

Performing an image warp process may require a processor to perform a pixel-by-pixel read/write operation, which may be processor-intensive and may require both high processing throughput and high bandwidth throughput. Performing the composite or one step operation reduces processing demands on the processor and other processing resources, as well as reducing consumption of a battery or other power resources.

FIG. 5A illustrates an example of a North-East-Down (NED) body frame coordinate system, in which positive values along the x-axis indicates north, positive values along the y-axis indicates east, and positive values along the x-axis indicates down (i.e., toward gravity).

FIG. 5B illustrates an example of a North-West-Up (NWU) body frame coordinate system in which positive values along the x-axis indicates north, positive values along the y-axis indicates west, and positive values along the x-axis indicates up (i.e., away from gravity).

With reference to FIGS. 1-5B, the changes in attitude (i.e., rotations about the roll, pitch and/or yaw) of a UAV within 3D space may cause distortions in images captured by an image sensor of the UAV. Changes in attitude about the yaw axis in particular poses a high likelihood of image distortion because the image sensor may experience both unintentional jitter/shake, as well as intentional yaw rotation, in the form of panning the image sensor. A processor of the UAV may be configured to track the attitude and changes in attitude of the UAV and to use the tracked attitude changes to mitigate resultant image distortion.

In some embodiments, information captured by the image sensor capture may be mapped to a matrix K. A point (X, Y, Z) in 3D space may be mapped to an image plane (x, y) based on a pin-hole. For example, the image sensor capture may be represented as:

$$K = \begin{bmatrix} F*zoom & 0 & c_x \\ 0 & F*zoom & c_y \\ 0 & 0 & 1 \end{bmatrix}$$ [Equation 4]

where F is a focal length in unit of pixels that relates to the image resolution, lens focal length, and camera sensor size.

Roll rotation (i.e., changes in attitude about the roll axis) may be represented by $$R_{roll} = \begin{bmatrix} 1 & 0 & 0 \\ 0 & \cos\varphi & -\sin\varphi \\ 0 & \sin\varphi & \cos\varphi \end{bmatrix}$$ [Equation 5]

where φ may be obtained through 3D decomposition.

In order to compensate for roll rotation, the roll rotation may be multiplied by the image sensor capture matrix K and the inverse of the image sensor capture matrix. For example, the corrected roll matrix may be represented by:

$$W_{roll}=KR_{roll}^{-1}K^{-1}$$ [Equation 6]

In terms of pixels, the roll transformation matrix (i.e., roll correction transformation) may require the inverse of the roll rotation matrix. For example, the roll transformation matrix may be represented by:

$$TF_{roll}=W_{roll}^{-1}=KR_{roll}K^{-1}$$ [Equation 7]

Pitch rotation (i.e., changes in attitude about the pitch axis) may be represented by $$R_{pitch} = \begin{bmatrix} \cos\varphi & 0 & -\sin\varphi \\ 0 & 1 & 0 \\ \sin\varphi & 0 & \cos\varphi \end{bmatrix}$$ [Equation 8]

Where φ may be obtained through 3D decomposition.

Like roll, pitch may be compensated for by multiplying the image sensor capture matrix K and the inverse of the image sensor capture matrix with the pitch rotation matrix. For example, the corrected roll matrix may be represented by:

$$W_{pitch}=KR_{pitch}^{-1}K^{-1}$$ [Equation 9]

In terms of pixels, the pitch transformation matrix (i.e., pitch correction transformation) may require the inverse of the pitch rotation matrix. For example, the pitch transformation matrix may be represented by:

$$TF_{pitch}=W_{pitch}^{-1}=KR_{pitch}K^{-1}$$ [Equation 10]

In order to mitigate image distortion, the processor of the UAV may use attitude information, such as received from an avionics system, to determine how to process images to filter out distortion effects. For example, the UAV may detect intentional yaw rotation and filtered the intentional yaw rotation from unintentional yaw rotation and noise. At some point the movement is large enough that it reaches a margin available for stabilization and cannot be further stabilized. Movement beyond the available margin for stabilization may become visible, especially in a video, as a displeasing effect of a stable video followed by a jump followed by a pan. In some embodiments, the processor may determine and apply a panning filter to mitigate such jumps at the beginning and end of a pan as well as to stabilize pans.

Various embodiments enable an adaptive motion filter in which a degree of filtering is determined based on "how close" an image is to the total margin available for stabilization. Determining "how close" an image is to the image crop margin may be complicated because an estimated transformation may lead to different shifts at different parts of the image. Thus, in some embodiments, a maximum shift of all four corners of the image may be considered instead. If the shift is less than half the margin size, this filter gives strong stabilization by setting α to 0.001. When the shift offset exceeds half the margin size, the filter may increasingly capture the movement as a pan and may prevent the transformed image from reaching the end of the margin. For example, a parameter $α_z$ may be artificially increased since it is important that the net roll of the frame be zero on average, else a slightly rotated video is observed. Net pitch and yaw may only lead to a change in the effective field of view and thus may be tolerated.

$$pan_x=(1-\alpha)\cdot pan_{x-1}+\alpha\cdot Gyro_x$$ [Equation 11]

$$Gyro_{x\text{-}eff}=Gyro_x-pan_x$$ [Equation 12]

Yaw may be modeled as the combination of intentional yaw rotation, unintentional yaw rotation, and yaw noise, for an image n. The yaw for an image n may be represented by the function:

$$\gamma(n)=\tilde{\gamma}(n)+\hat{\gamma}(n)+\varepsilon(n)$$ [Equation 13]

where $\tilde{\gamma}(n)$ is the intentional yaw rotation, such as from panning of an image sensor; $\hat{\gamma}(n)$ is the unintentional yaw rotation; and ε(n) is the yaw noise.

By obtaining the global yaw $\gamma(n)$ throughout image capturing operations by the UAV, and applying an adaptive infinite impulse response filter (IIR), the processor of the UAV may filter out the unintentional yaw and yaw noise. The adaptive yaw correction parameter $\delta$ may be modified throughout image capture operations based on the motion mode of the UAV. The intentional yaw may be represented as the result of the global yaw and the yaw correction parameter in an IIR filter function:

$$\tilde{\gamma}(n)=(1-\delta(n))\tilde{\gamma}(n-1)+\delta(n)\gamma(n) \quad \text{[Equation 14]}$$

The processor of the UAV may adjust the motion mode throughout image capture operations by analyzing current attitude information. For example, a hovering drone may experience little change in attitude and similarly may experience only a small yaw rotation. Conversely, a fast-moving or fast-rotating drone may be in a fast yaw rotation mode and may experience more extreme changes in attitude such as yaw rotation. The processor of the UAV may periodically obtain attitude (e.g., yaw) information from sensors, such as the gyroscope and altimeter that may be part of the UAV avionics system. In some embodiments, such periods may be relatively short to enable frequent monitoring of the attitude (e.g., yaw) information. The processor may update the value of the yaw correction parameter as the attitude of the UAV changes in order to enable smooth transitioning of motion filtering during transitions between motion modes.

The maximum allowable yaw correction may be expressed as a function of how frequently the processor of the UAV checks for attitude updates. For example, an attitude update timer T (e.g., 2 ms) may be used to define a time constant $\tau$ such that:

$$\tau = \frac{T}{\delta(n)} \quad \text{[Equation 15]}$$

The processor may use the time constant to calculate a yaw threshold (e.g., a rotation threshold) and an associated maximum yaw correction. The yaw threshold u may be represented by the function:

$$u = \frac{1}{\tau} = \frac{\delta(n)}{T} \in \left[\frac{800}{60}, 100\right] \quad \text{[Equation 16]}$$

For example, a $\delta(n)$ of 0.065 and T of 2 ms results in a maximum yaw threshold of 25 Hz. Above this frequency, all yaw may be filtered out as noise or unintentional yaw.

Figure 6:
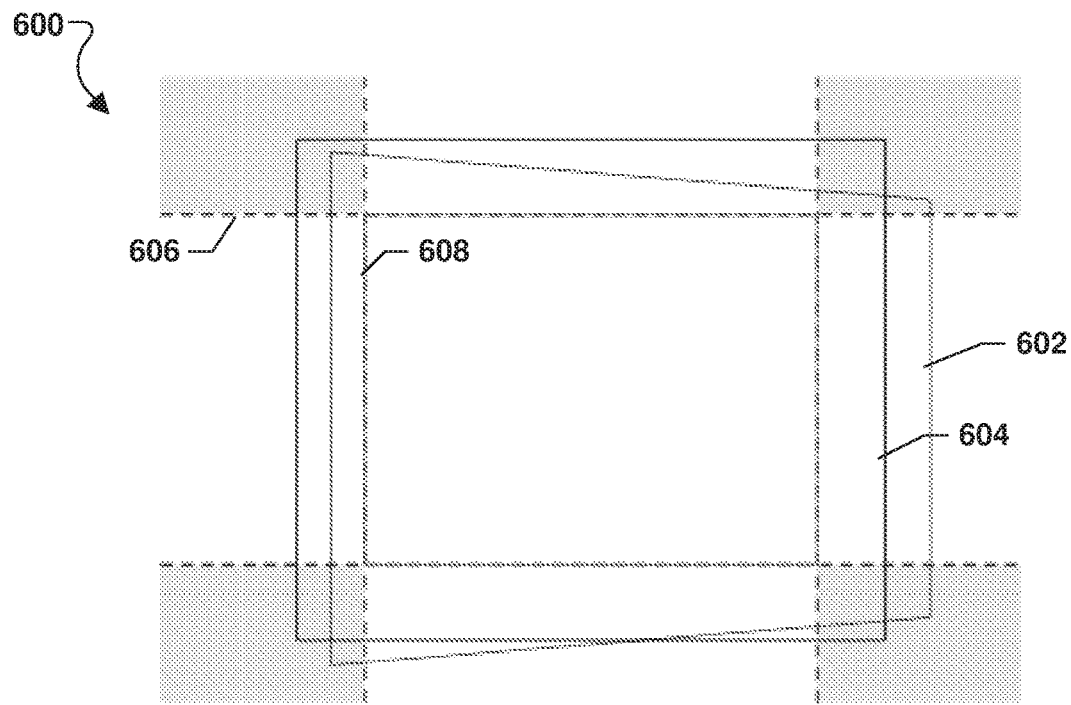
FIG. 6 illustrates a transformed image overlaid on a boundary region in an image processing scheme according to various embodiments.

FIG. 6 illustrates image processing 600 in a UAV according to various embodiments. With reference to FIGS. 1-6, a processor of a UAV (e.g., the processor 220 and/or the like) and hardware components and/or software components of the UAV may capture and process an image or video using an image sensor of the UAV (e.g., the image sensor 306).

An image captured by the image sensor 306 of the UAV may have a generally uniform geometric boundary 604. However, the subject of such images may be visually skewed and require adjustment or transformation in order to correct the visual depiction. The transformed image may have an irregularly shaped boundary 602. Both the captured image and the transformed images are likely to be larger than the threshold boundary 606 the UAV processor employs for image processing. Thus, only those portions of the captured and/or transformed image that lie within the image crop margin 608 defined by the threshold boundary 606 will be output for display, storage, or further image processing.

Margins limit how much shake/jitter can be removed from a video or image captured by the UAV. If the margin is very small, EIS may not be able to accurately and efficiently remove shake/jitter resulting from margin breaches. Margin breaches occur when a portion of the captured or transformed image boundaries 604, 602, cross over the image crop margin 608. The margin may include two parts: physical margin and virtual margin. The physical margin may be provided by the image sensor and may not affect video or image quality. But, the virtual margin may be the extra margin or buffer zone and may result in image blur.

When EIS is enabled, the processor of the UAV may allocate a buffer, for example, larger than the desired output image. The captured image contains actual image pixel data, some of which may be cropped during image processing. As the image sensor 306 moves along with the UAV, the image sensor 306 may shake and the field of view (FOV) captured within a desired output boundary moves. As long as the shake is low to moderate, the processor may move the captured Image boundary 604 within the output boundary counter to the direction of motion to provide a stable image. However, if shake/jitter is large enough, the need to move the captured image boundary 604 to counter the motion exceeds the perimeter of the output boundary. This is called a margin breach. Parts of the captured image 604 that lie outside the boundary cannot be filled with valid pixel data as the valid pixels lie within the output boundary Thus, when a margin breach occurs, a correction cannot be made and a visual jump may be observed in the captured video or white/empty space in an image.

Typical pre-set physical margins may be 10% of the image size. This provides a 5% "half" margin on all four sides of the image. A 5% "half" margin may be insufficient to stabilize video or images in situations involving rapid movement or heavy pitch, yaw, or roll of the UAV. Virtual margin may be introduced to provide additional buffer and enable more accurate and efficient stabilization in UAVs, which may move at high speeds and with substantial shake/jitter while in flight. Working within the virtual instead of the physical margin when countering motion may place some parts the captured image 604 outside the output boundary, the processor may not report a margin breach and may continue image processing and image distortion correction. But because there are no valid pixels for parts of the output image that crosses the physical margin, artifacts may appear in these areas. To prevent the artifacts from appearing in an output image, a crop may be applied.

The image crop margin 608 may be smaller than the captured image 604 and thus may require that the image be zoomed to the output resolution (e.g., 1080P) and in doing some blur may be introduced.

In various embodiments, the physical margin on each side of the image P (usually 5%) and the virtual margin on each side V (usually from 2.5%-5%) may be used to represent the margin and crop scale. For example, the margin and crop scale may be represented by the functions:

$$Margin_{scale} = \frac{P+V}{P} \quad \text{[Equation 17]}$$

$$Crop_{scale} = 1 + 2V \quad \text{[Equation 18]}$$

As part of a pan filtering, the UAV processor may determine when a transformed image boundary 602 approaches the edges of the image crop margin 608. Four points represented by the four corners of the image, in_points=(1, 1), (w, 1), (1, h), (w, h), may be tracked with reference to an estimated transformation of the image (out_points). The parameters w and h refer to the width and height of the image frame. The maximum shift among these four points along both the x and y axes may be represented by the functions:

$$X\text{shift}=\max(\text{abs}(\text{out\_points}(:,1)-\text{in\_points}(:,1))) \quad \text{[Equation 19]}$$

$$Y\text{shift}=\max(\text{abs}(\text{out\_points}(:,2)-\text{in\_points}(:,2))) \quad \text{[Equation 20]}$$

This xshift and yshift may be used to constraint the projective transform and set panning filter parameters. It may be difficult to calculate what projective transform (e.g., transformed image boundary 602) can be applied to the captured image 604 such that corner points will map to the edges of the allowed image crop margin 608. Instead, this may be inferred by calculating the position of the corners of the transformed image boundary 602 from the captured image 604 and checking whether the corners are within the margin. If this is true, the transformed image will not intersect the image crop margin 608.

Figure 7:
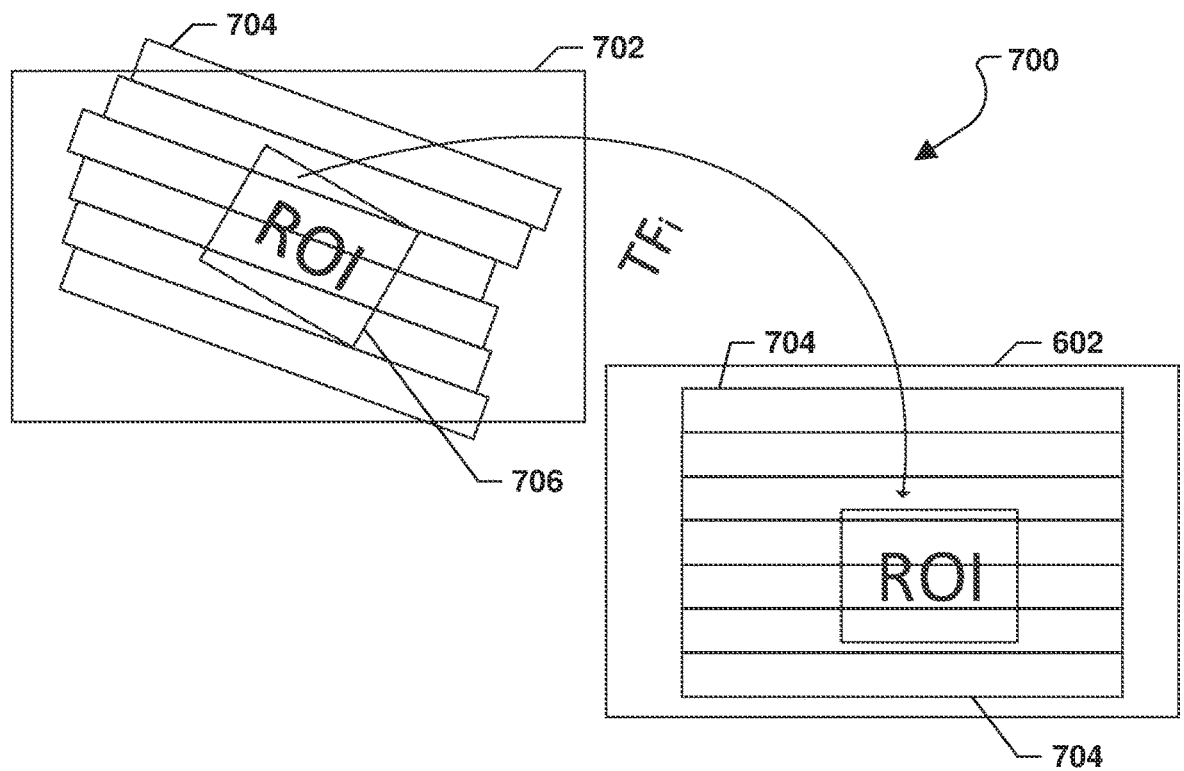
FIG. 7 is a component block diagram illustrating transformation of lines of an image captured by a UAV according to various embodiments.

FIG. 7 illustrates image processing 700 in a UAV according to various embodiments. With reference to FIGS. 1-7, a processor of a UAV (e.g., the processor 220 and/or the like) and hardware components and/or software components of the UAV may capture and process an image or video using an image sensor of the UAV (e.g., the image sensor 306).

An image divided into subframes as a result of a line-read image sensor capture may have multiple subframes 704 that are skewed with reference to the horizontal/level image 702. A region of interest 706 within the captured image may be skewed as a result of the rolling shutter distortion and or pitch, yaw, roll of the UAV. By applying a transformation matrix to subframes 704, the subframes may be corrected to provide an even horizontal image in which the region of interest 706 appears horizontal.

Figure 8:
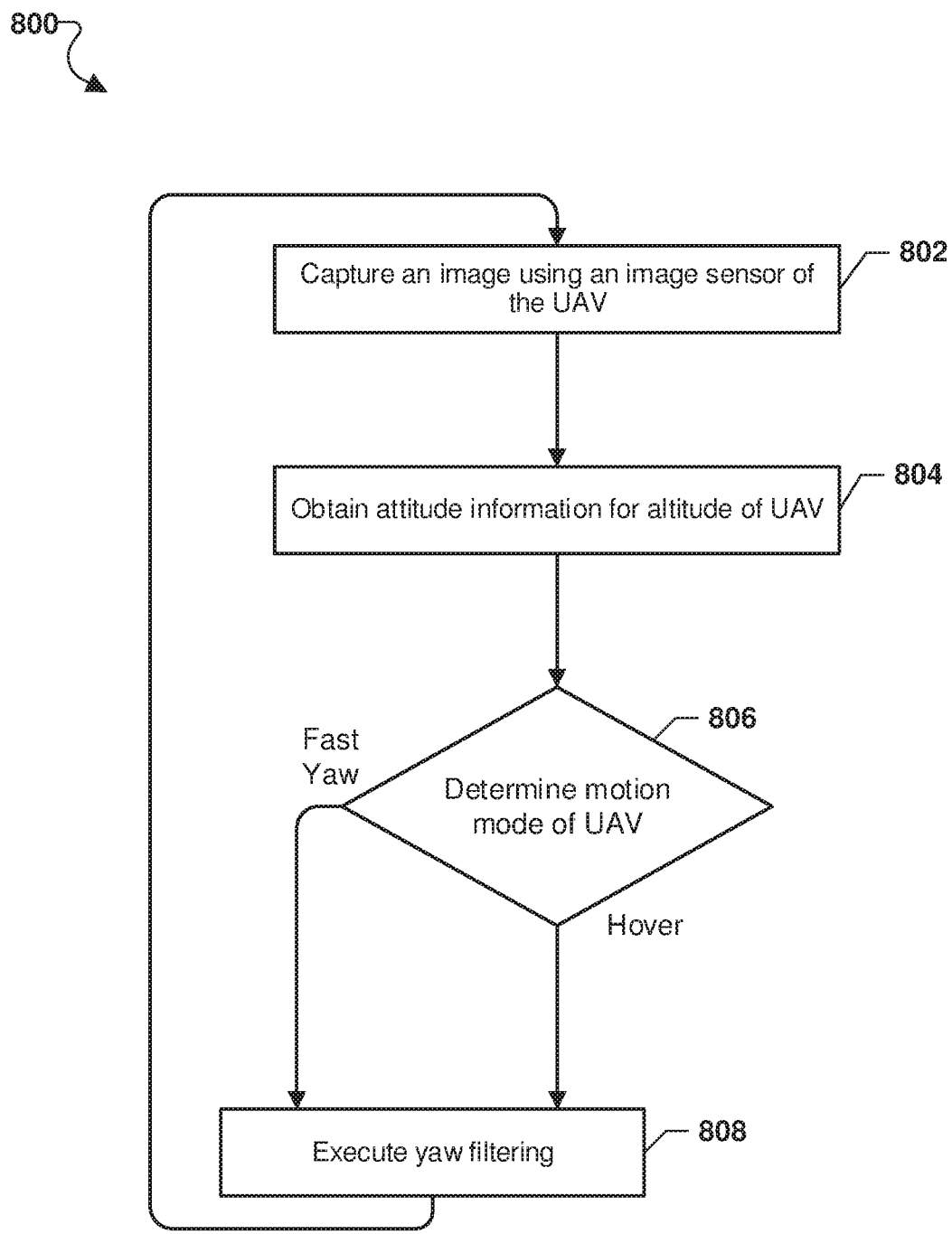
FIG. 8 is a process flow diagram illustrating embodiment methods for motion filtering of images captured by an image sensor of a UAV according to various embodiments.

FIG. 8 illustrates a method 800 of adaptive image processing in a UAV (e.g., 102, 200 in FIGS. 1 and 2) according to various embodiments. With reference to FIGS. 1-8, the method 800 may be implemented by a processor (e.g., the processor 220 and/or the like) of the UAV.

In block 802, an image sensor of the UAV may capture an image. In various embodiments, an image sensor mounted on or integrated into a UAV may capture an image or frame of a video.

In block 804, an attitude sensor of the UAV may obtain attitude information relating to the UAV. Attitude information may include current attitude and changes in attitude. The processor may collect the attitude information directly from UAV sensors, or may infer the attitude information based on information provided by a number of sensors (e.g., gyro, altimeter, etc.) internal or external to the UAV.

In determination block 806, the processor may determine a motion mode of the UAV. The processor of the UAV may analyze the obtained attitude information and determine whether the UAV is a "hovering" mode or is in a "fast yaw" mode (e.g., rapidly moving or panning). In a hovering mode, the UAV may experience relatively minor variations in attitude as the UAV attempts to maintain the same relative position in air space. However, a rapidly moving or panning UAV may experience rapid changes in attitude as the UAV travels through air pockets of varying density and encounters changes in wind speed/direction.

In block 808, the processor may use the result of the determination of UAV motion mode during the execution of yaw filtering. A UAV in the hovering mode may experience small yaw rotation, which is likely to be intentional as the image sensor pans slightly. Conversely, a UAV in the fast yaw mode may experience large degrees of yaw rotation as the UAV pans to capture an image of a large area or as the UAV moves rapidly through an airspace. The impact of determining one motion mode versus another is discussed in greater detail with reference to FIG. 9.

Figure 9:
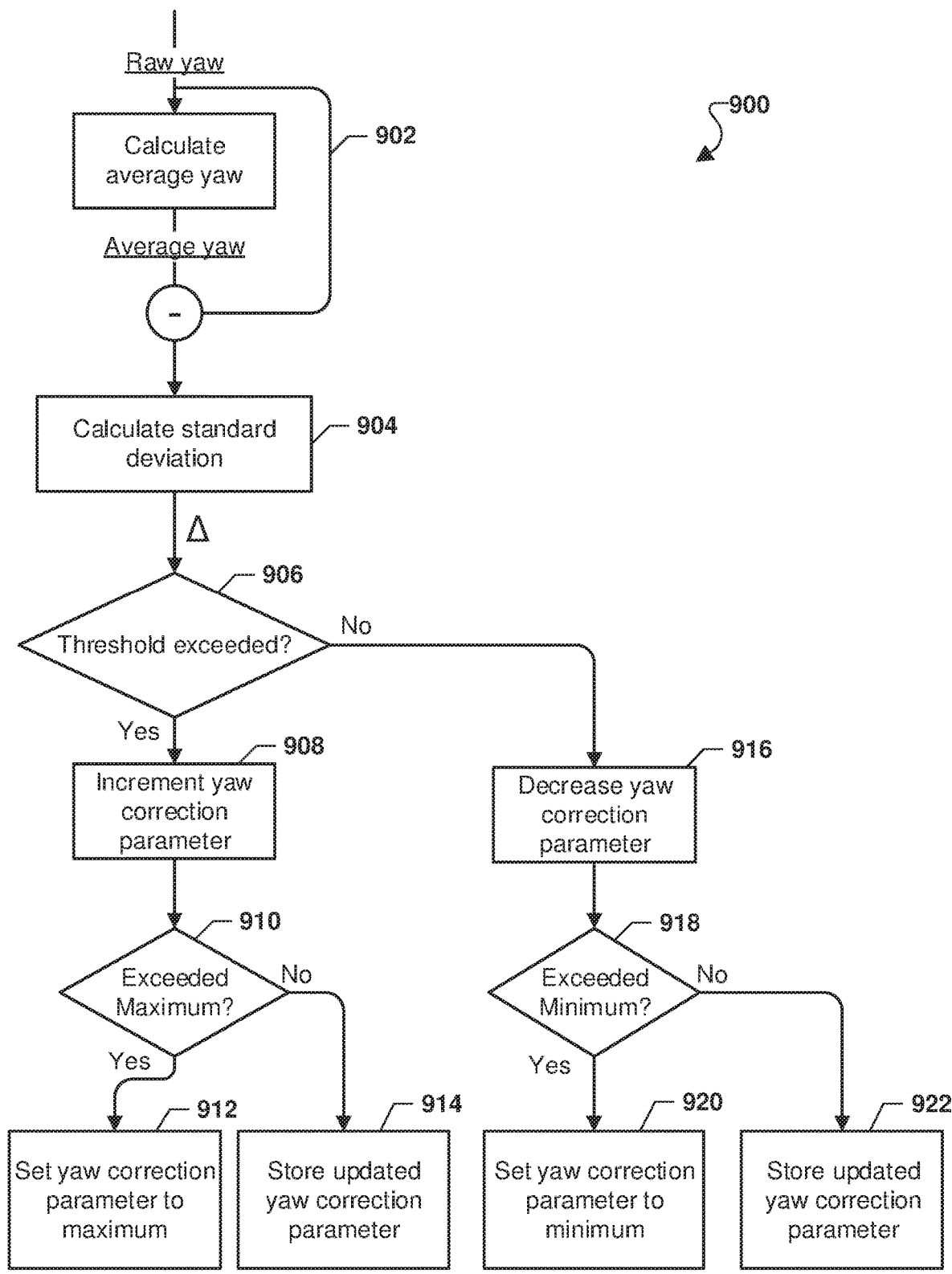
FIG. 9 is a process flow diagram illustrating embodiment methods for image tracking by an image sensor of a UAV according to various embodiments.

FIG. 9 illustrates a method 900 of motion filtering in an image captured in a UAV (e.g., 102, 200 in FIGS. 1 and 2) according to various embodiments. With reference to FIGS. 1-9, the method 900 may be implemented by a processor (e.g., the processor 220 and/or the like) of the UAV.

In block 902, the processor may calculate an average yaw rotation experienced by the UAV. For example, the processor may measure or infer the yaw rotation based on data from a sensor of the UAV (e.g., a gyroscope) and may monitor the yaw rotation throughout operation. In some embodiments, the processor may average the yaw rotation on an ongoing basis over a sliding window. For example, as the processor receives or obtains new yaw rotation information from the gyroscope sensor, the processor may continuously recalculate the average rate of yaw.

In block 904, the processor may calculate a standard deviation of the average rate of yaw. In some embodiments, the processor may calculate a mean value for each window over which the average rate of yaw is calculated. The processor may calculate the standard deviation based on the mean value of each sample set (e.g., each window). Thus, the processor may determine the standard deviation a moving value and may update the standard deviation as the average yaw is recalculated over sample sets.

In determination block 906, the processor may determine whether yaw rotation exceeds a threshold based, at least in part, on the calculated average yaw and the calculated standard deviation.

In response to determining that the yaw rotation exceeds a threshold (i.e., determination block 906="Yes") the processor may increase a yaw correction parameter in block 908. In various embodiments, the increase may be in uniform step sizes such as 0.001, 0.0005, etc.

In determination block 910, the processor may determine whether a maximum yaw correction is exceeded. The maximum may be based on a maximum permitted yaw rotation of the UAV image sensor 306. Yaw rotation exceeding the maximum may result in over-yawing, such as when the UAV rotates 720 degrees.

In response to determining that the maximum yaw correction is exceeded (i.e., determination block 910="Yes") the processor may set the yaw correction parameter to the maximum yaw correction in block 912. For example, the yaw correction parameter may be set to 0.05 (e.g., based on the rotation example described with reference to FIGS. 5A-5B).

In response to determining that the maximum yaw correction is not exceeded (i.e., determination block 910="No") the processor may store the updated yaw correction parameter and use it in executing a filter function in block 914.

In response to determining that the yaw rotation does not exceed a threshold (i.e., determination block 906="No") the processor may decrease a yaw correction parameter in block 916. In various embodiments, the yaw correction parameter may be decreased in uniform step sizes such as 0.001, 0.0005, etc.

In determination block 918, the processor may determine whether a minimum yaw correction is exceeded. The minimum may be based on a minimum permitted yaw rotation of the UAV image sensor 306, which may not be less than 0.

In response to determining that the minimum yaw correction is exceeded (i.e., determination block 918="Yes") the processor may set the yaw correction parameter to the minimum yaw correction in block 920. Thus, if the yaw correction parameter is decreased to a value less than the minimum yaw correction permitted, then the yaw correction parameter may be set to the minimum and the decrease ignored.

In response to determining that the minimum yaw correction is not exceeded (i.e., determination block 918="No") the processor may store the decreased yaw correction parameter and use it in executing a filter function in block 922.

Various embodiments enable the processor of the UAV to improve image capture and processing by the UAV. Various embodiments also improve the efficiency of image capture and processing by the UAV. Various embodiments further improve the accuracy of motion filtering and region of interest tracking during image capture by the image sensor 306. Various embodiments enable improved image capture and processing by the UAV for a variety of body frame coordinate systems.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 800 and 900 may be substituted for or combined with one or more operations of the methods 800 and 900, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of motion filtering an image in an unmanned autonomous vehicle (UAV), comprising:

capturing an image by an image sensor associated with the UAV;

obtaining attitude information of the UAV by an attitude sensor of the UAV;

determining a UAV motion mode based, at least in part, on the obtained attitude information; and executing yaw filtering on the image based, at least in part, on the determined UAV motion mode wherein the executing yaw filtering comprises:
calculating an average yaw over a sliding window;
calculating a standard deviation of the calculated average yaw;
determining whether a yaw threshold is exceeded based, at least in part, on the calculated average yaw and the calculated standard deviation;
modifying a yaw correction parameter based, at least in part, on the determination of whether the yaw threshold is exceeded; and
executing a filter function using the yaw correction parameter.

2. The method of claim 1, further comprising setting the yaw threshold to a frequency of 35 Hz in response to determining that the UAV motion mode is a fast yaw mode.

3. The method of claim 1, further comprising setting the yaw threshold to a frequency of 25 Hz in response to determining that the UAV motion mode is a hover mode.

4. The method of claim 1, further comprising in response to determining that the yaw threshold is exceeded:
incrementing the yaw correction parameter;
determining whether a maximum yaw correction is exceeded; and
setting the yaw correction parameter to the maximum yaw correction.

5. The method of claim 1, further comprising in response to determining that the yaw threshold is not exceeded:
decrementing the yaw correction parameter;
determining whether a minimum yaw correction is exceeded; and
setting the yaw correction parameter to the minimum yaw correction.

6. The method of claim 1, wherein the filter function includes an infinite impulse response filter.

7. An unmanned autonomous vehicle (UAV), comprising:
an image sensor;
an attitude sensor; and
a processor coupled to the image sensor and the attitude sensor, and configured with processor-executable instructions to:
capture an image by the image sensor;
obtain attitude information of the UAV by the attitude sensor;
determine a UAV motion mode based, at least in part, on the obtained attitude information; and
execute yaw filtering on the image based, at least in part, on the determined UAV motion mode by:
calculating an average yaw over a sliding window;
calculating a standard deviation of the calculated average yaw;
determining whether a yaw threshold is exceeded based, at least in part, on the calculated average yaw and the calculated standard deviation;
modifying a yaw correction parameter based, at least in part, on the determination of whether the yaw threshold is exceeded; and
executing a filter function using the yaw correction parameter.

8. The UAV of claim 7, wherein the processor is further configured with processor-executable instructions to set the yaw threshold to a frequency of 35 Hz in response to determining that the UAV motion mode is a fast yaw mode.

9. The UAV of claim 7, wherein the processor is further configured with processor-executable instructions to set the yaw threshold to a frequency of 25 Hz in response to determining that the UAV motion mode is a hover mode.

10. The UAV of claim 7, wherein in response to determining that the yaw threshold is exceeded the processor is further configured with processor-executable instructions to:
increment the yaw correction parameter;
determine whether a maximum yaw correction is exceeded; and
set the yaw correction parameter to the maximum yaw correction.

11. The UAV of claim 7, wherein in response to determining that the yaw threshold is not exceeded the processor is further configured with processor-executable instructions to:
decrement the yaw correction parameter;
determine whether a minimum yaw correction is exceeded; and
setting the yaw correction parameter to the minimum yaw correction.

12. The UAV of claim 7, wherein the filter function includes an infinite impulse response filter.

13. An unmanned autonomous vehicle (UAV), comprising:
means for capturing an image;
means for obtaining attitude information of the UAV;
means for determining a UAV motion mode based, at least in part, on the obtained attitude information; and
means for executing yaw filtering on the image based, at least in part, on the determined UAV motion mode comprising:
means for calculating an average yaw over a sliding window;
means for calculating a standard deviation of the calculated average yaw;
means for determining whether a yaw threshold is exceeded based, at least in part, on the calculated average yaw and the calculated standard deviation;
means for modifying a yaw correction parameter based, at least in part, on the determination of whether the yaw threshold is exceeded; and
means for executing a filter function using the yaw correction parameter.

14. A non-transitory processor-readable storage medium having stored thereon processor-executable instructions configured to cause a processor of an unmanned autonomous vehicle (UAV) to perform operations comprising:
capturing an image by an image sensor associated with the UAV;
obtaining attitude information of the UAV by an attitude sensor of the UAV;
determining a UAV motion mode based, at least in part, on the obtained attitude information; and
executing yaw filtering on the image based, at least in part, on the determined UAV motion mode by:
calculating an average yaw over a sliding window;
calculating a standard deviation of the calculated average yaw;
determining whether a yaw threshold is exceeded based, at least in part, on the calculated average yaw and the calculated standard deviation;
modifying a yaw correction parameter based, at least in part, on the determination of whether the yaw threshold is exceeded; and
executing a filter function using the yaw correction parameter.

15. The non-transitory processor-readable storage medium of claim 14, wherein the stored processor-executable instructions are configured to cause the processor of the UAV to perform operations further comprising setting the yaw threshold to a frequency of 35 Hz in response to determining that the UAV motion mode is a fast yaw mode.

16. The non-transitory processor-readable storage medium of claim 14, wherein the stored processor-executable instructions are configured to cause the processor of the UAV to perform operations further comprising setting the yaw threshold to a frequency of 25 Hz in response to determining that the UAV motion mode is a hover mode.

17. The non-transitory processor-readable storage medium of claim 14, wherein the stored processor-executable instructions are configured to cause the processor of the UAV to perform operations further comprising in response to determining that the yaw threshold is exceeded:
   incrementing the yaw correction parameter;
   determining whether a maximum yaw correction is exceeded; and
   setting the yaw correction parameter to the maximum yaw correction.

18. The non-transitory processor-readable storage medium of claim 14, wherein the stored processor-executable instructions are configured to cause the processor of the UAV to perform operations further comprising in response to determining that the yaw threshold is not exceeded:
   decrementing the yaw correction parameter;
   determining whether a minimum yaw correction is exceeded; and
   setting the yaw correction parameter to the minimum yaw correction.

19. The non-transitory processor-readable storage medium of claim 14, wherein the stored processor-executable instructions are further configured to cause the processor of the UAV to perform operations such that the filter function includes an infinite impulse response filter.

* * * * *